(12) United States Patent
Meenakshisundaram

(10) Patent No.: US 7,844,829 B2
(45) Date of Patent: Nov. 30, 2010

(54) SECURED DATABASE SYSTEM WITH BUILT-IN ANTIVIRUS PROTECTION

(75) Inventor: Sethu Meenakshisundaram, Alameda, CA (US)

(73) Assignee: Sybase, Inc., Dublin, CA (US)

( * ) Notice: Subject to any disclaimer, the term of this patent is extended or adjusted under 35 U.S.C. 154(b) by 1353 days.

(21) Appl. No.: 11/307,001

(22) Filed: Jan. 18, 2006

(65) Prior Publication Data

US 2007/0168678 A1    Jul. 19, 2007

(51) Int. Cl.
G06F 12/14 (2006.01)
(52) U.S. Cl. .......................... 713/189; 726/26; 380/277
(58) Field of Classification Search ................. 713/189, 713/1, 2, 188, 194; 380/200, 201, 255, 277, 380/278; 726/2, 26, 27
See application file for complete search history.

(56) References Cited

U.S. PATENT DOCUMENTS

| | | |
|---|---|---|
| 4,975,950 A | 12/1990 | Lentz |
| 5,084,816 A | 1/1992 | Boese et al. |
| 5,121,345 A | 6/1992 | Lentz |
| 5,278,901 A | 1/1994 | Shieh et al. |
| 5,291,590 A | 3/1994 | Ohnishi et al. |
| 5,311,591 A | 5/1994 | Fischer |
| 5,319,776 A | 6/1994 | Hile et al. |
| 5,359,659 A | 10/1994 | Rosenthal |
| 5,361,359 A | 11/1994 | Tajalli et al. |
| 5,414,833 A | 5/1995 | Hershey et al. |
| 5,440,723 A | 8/1995 | Arnold et al. |
| 5,511,163 A | 4/1996 | Lerche et al. |
| 5,623,600 A | 4/1997 | Ji et al. |
| 5,649,095 A | 7/1997 | Cozza |
| 5,832,208 A | 11/1998 | Chen et al. |
| 6,134,664 A | 10/2000 | Walker |
| 6,141,686 A | 10/2000 | Jackowski et al. |
| 6,141,755 A | 10/2000 | Dowd et al. |
| 6,185,689 B1 | 2/2001 | Todd, Sr. et al. |
| 6,189,032 B1 | 2/2001 | Susaki et al. |
| 6,279,113 B1 | 8/2001 | Vaidya |
| 6,324,647 B1 | 11/2001 | Bowman-Amuah |
| 6,611,925 B1 | 8/2003 | Spear |
| 6,742,128 B1 | 5/2004 | Joiner |
| 6,944,772 B2 | 9/2005 | Dozortsev |
| 7,062,553 B2 | 6/2006 | Liang |
| 7,080,000 B1 | 7/2006 | Cambridge |
| 7,107,618 B1 | 9/2006 | Gordon et al. |
| 7,111,005 B1 * | 9/2006 | Wessman ....................... 707/9 |

(Continued)

*Primary Examiner*—Kimyen Vu
*Assistant Examiner*—Joseph Pan
(74) *Attorney, Agent, or Firm*—John A. Smart

(57) ABSTRACT

A secured database system with built-in antivirus protection is described. In one embodiment, for example, a method of the present invention is described for securing a database system, the method comprises steps of: provisioning storage from a storage device, for storing database information; generating an encryption key so that the database information is stored on the storage device in an encrypted manner; generating a decryption key for decrypting the database information stored on the storage device, wherein access to the decryption key is controlled by the database system based on user privileges; receiving a request from a user for access to the database information; determining whether the user has been granted sufficient privileges to access the database information; if the user has been granted sufficient privileges, automatically decrypting the database information to provide the access; and otherwise denying the request if the user has not been granted sufficient privileges.

25 Claims, 11 Drawing Sheets

U.S. PATENT DOCUMENTS

| | | |
|---|---|---|
| 7,188,369 B2 | 3/2007 | Ho et al. |
| 2002/0078049 A1* | 6/2002 | Samar .......................... 707/9 |
| 2004/0049687 A1* | 3/2004 | Orsini et al. ................ 713/189 |
| 2005/0071633 A1* | 3/2005 | Rothstein .................... 713/167 |
| 2005/0273858 A1* | 12/2005 | Zadok et al. .................. 726/24 |
| 2006/0021057 A1* | 1/2006 | Risan et al. ................... 726/26 |
| 2006/0026686 A1 | 2/2006 | Trueba |
| 2006/0259974 A1 | 11/2006 | Marinescu et al. |
| 2006/0272021 A1 | 11/2006 | Marinescu |
| 2006/0291664 A1* | 12/2006 | Suarez et al. ............... 380/286 |

\* cited by examiner

SECURED DATABASE SYSTEM WITH BUILT-IN ANTIVIRUS PROTECTION

CROSS REFERENCE TO RELATED APPLICATIONS

The present application is related to the following commonly-owned, presently-pending application(s): application Ser. No. 10/711,929, filed Oct. 13, 2004, entitled "Database System Providing SQL Extensions for Automated Encryption and Decryption of Column Data". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 20819 Bytes, created: Jan. 10, 2006 12:56:04 PM; Object ID: File No. 1; Object Contents: Source code.

BACKGROUND OF INVENTION

1. Field of the Invention

The present invention relates generally to data processing environments and, more particularly, to system and methodology for securing databases in online, offline, and archive modes.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Most of the enterprise implementation of database systems today use volume manager technology. FIG. 1A is a high-level block diagram of a database server system 1 using volume manager technology. As shown, the system 1 includes a server computer 10, running under the control of an operating system, that may host or incorporate one or more volume managers 20 that effectively sit on top of the operating system's file system 30. Server computer 10 communicates with other computers, including ones that are "database clients" (i.e., ones that use the database services provided by the server computer 10). The file system 30 stores and manages the various objects, such as SQL databases 40 (e.g., Sybase ASE database). Volume manager(s) 20, for example available from Veritas (division of Symantec, Inc. of Cupertino, Calif.), provide virtualization to storage devices at the operating system level, thus making it easy to administer storage subsystems. While the volume manager provides storage level virtualization, the storage devices can be used as "raw" or "cooked". Technology like Veritas Storage Foundation provides additional functionality on top of a virtualized storage subsystem in the form of a special file system that understands database read/write patterns, with accompanying accelerated performance of I/O to the subsystem. On top of the file system or raw device, the SQL database 40 (e.g., database engine of Sybase ASE) writes a file system-like structure to manage the allocation of the storage from the database engine level.

In a typical deployment, a computer system provisions resources or devices for use by a given database, such as hard disk resources. Usually, the task of provisioning resources falls to the System Administrator (SA), who is a user with special privileges ("superuser") that allow special access to underlying hard disk resources. After the SA has provisioned a computer system's hard disk for use, another user—the Database Administrator (DBA)—provisions the database for use. Provisioning the database includes logically setting up database tables and granting users various rights to use the database. Thus, for system 1 in FIG. 1A, the components (i.e., server/computer, volume managers, file systems or raw devices) are managed by the system administrator (SA). Once the SA allocates the storage devices to the SQL database 40, the database administrator (DBA) decides what table(s) are placed in which devices, and manages the placement. However, for system 1, since the SA has the ownership of the SA domain, he or she may copy the storage device and start a bootleg copy of the SQL database (e.g., Sybase ASE database) on another machine.

For purposes of providing basic checks and balances (i.e., security), typically the SA and DBA are not the same person. The approach is hardly foolproof, however. If knowledgeable enough, the SA (or an intruder posing as the SA) has sufficient control over the computer system's physical devices to hijack the database. After all, the computer's hard disks are merely physical devices, and can be manipulated as such (e.g., for copying files). For example, an unscrupulous SA may copy the database onto another hard disk (e.g., online copy), thereby instantiating a second copy of the database all without the knowledge of the DBA. In particular, in this online scenario there is no mechanism for the DBA to uncover that the database has been compromised, since the database has been copied to a second machine (that the DBA is completely unaware of). Accordingly, today there exists a basic flaw with the approach used to set up database systems.

Besides the foregoing online scenario, there is also a basic flaw with the way databases are archived. To archive data, the DBA will use a utility to copy the database files to some disk. In doing so, the DBA will likely expose the disk to the SA (who has superuser privileges). Thus, the SA may gain access to those archival database files, and in turn may reload those files in a manner to re-create the database (again, an instance that the DBA is completely unaware of). Although one normally assumes that there is some degree of checks and balances between the SA and the DBA, the foregoing illustrates two examples where the database may be compromised.

Although the foregoing has focused on instances where an unscrupulous SA may compromise the database, it should also be understood that the ordinary checks and balances also do not serve to prevent collusion between the DBA and the SA. An auditing subsystem provides the checks and balances. While user security controls who "can" do what, auditing provides a solution to non-repudiation in terms of who "did" what, when. Suppose, for instance, that an important database is subject to auditing by a third party auditor (i.e., independent of the DBA). Normally, the auditor would be able to monitor the DBA's actions (by reviewing audit logs) for detecting unauthorized activities from an unscrupulous DBA. In this normal scenario, the DBA would not be able to tamper with the audit logs since the DBA does not have access to the underlying devices (e.g., hard disk). If the DBA were to conspire with the SA, however, the two may be able to compromise the database in a manner that is undetectable to the auditor. Present-day data centers do not address these issues, and therefore leave their underlying databases exposed. In this age of ever increasing identity theft, leaving database systems exposed poses a substantial security risk.

The current approaches to addressing this problem are cumbersome. Just as a database system may have auditing capabilities, certain high security operating systems can be fitted with auditing facilities (i.e., nonrepudiation log of "who did what when"). Similarly, certain systems may employ a superuser shell with auditing capability, so that actions of the SA may be tracked. However, these are manual solutions that are highly customized for a given customer's deployment. As a result, the solutions do not operate transparently (i.e., in the background, without detection), and since they are very specific to a customer's situation (e.g., requiring manual editing of shell scripts and manual auditing of log files) they do not scale properly for widespread deployment across thousands of systems. Importantly, there is no built-in intelligence in these approaches that would prevent a database system from being compromised. Instead, the approach is at best a "postmortem" or after-the-fact log that an auditor would have to search through manually after the damage has already been done. Accordingly, a better solution is sought.

Another security problem is also present. As more unstructured data (e.g., free-form data such as images, .PDF files, documentation types, blob (binary) data, and other non-SQL data types) are stored in the database and managed, these unstructured data can be created and stored in the database without the benefit of antiviral protection, as present-day antivirus (AV) protection technology detects and clean viruses at the email gateways and as add-on modules (e.g., Symantec's Norton Anti-Virus (NAV) add-on to the Microsoft Windows operating system). Thus with increasing storage of unstructured or binary data in the database coupled with capabilities to embed viruses in that data (e.g., in images), customers are increasingly exposed to viruses present within stored unstructured data objects in databases.

Related to this issue is the security of the data that is stored where database engines have been able to separate responsibilities between data creators (using public key and encrypting) and owners of data (using private keys and decrypting) thus assuring security. The same cannot be said at the operational level between SAs (who are aware of the file system details) and the DBAs (who are aware of the data schemas). This exposes a risk as the SA and the DBA may act in concert as cohorts who can compromise data security. SAs can hijack raw data stores (devices) and work with DBAs to reconstruct the hijacked data stores, thereby compromising the entire system. This can include online disks or database archive dumps.

What is needed is a database system implementing methodologies that address security issues that may arise due to the interaction of two domains, the operating system domain and the database system domain. Such a solution should prevent database compromise that results from the current loophole that allows collusion between the system and database administrators. Specifically, the solution may store data in a database encrypted file system that prevents compromise to online, streaming, and archive data. The present invention fulfills this and other needs.

SUMMARY OF INVENTION

A secured database system with built-in antivirus protection is described. In one embodiment, for example, a method of the present invention is described for securing a database system, the method comprises steps of: provisioning storage from a storage device, for storing database information; generating an encryption key so that the database information is stored on the storage device in an encrypted manner; generating a decryption key for decrypting the database information stored on the storage device, wherein access to the decryption key is controlled by the database system based on user privileges; receiving a request from a user for access to the database information; determining whether the user has been granted sufficient privileges to access the database information; if the user has been granted sufficient privileges, automatically decrypting the database information to provide the access; and otherwise denying the request if the user has not been granted sufficient privileges.

In another embodiment, for example, a method of the present invention is described for securing a database system, the method comprises steps of: in response to input from a system administrator, provisioning storage from a storage device for storing database information; in response to input from a security officer, generating an encryption key so that the database information is stored on the storage device in an encrypted manner; in response to input from a database administrator, generating a decryption key for decrypting the database information stored on the storage device, wherein access to the decryption key is controlled by the database system based on user authorization; and providing access to the database information by decrypting the database information only for authorized users.

In yet another embodiment, for example, a secured database system of the present invention is described that comprises: a relational database management system (RDBMS); a storage device for provisioning storage of database information; an encryption key for encrypting the database information that is stored on the storage device; a decryption key, automatically maintained by the database system, for decrypting the database information stored on the storage device, wherein access to the decryption key is controlled by the database system based on user authorization; and a module for providing access to the database information by automatically decrypting the database information only for authorized users.

In another embodiment, for example, in a database system, a method of the present invention is described for providing protection against storage of computer viruses by the database system, the method comprises steps of: storing virus definitions, for allowing detection of computer viruses in data; receiving an SQL statement specifying storage of particular data in the database system; creating an execution plan for carrying out database operations for executing the SQL statement; and during execution of the execution plan, testing the particular data with the virus definitions, for detecting presence of a computer virus in the particular data.

In still another embodiment, for example, a database system of the present invention providing protection against storage of computer viruses is described that comprises: a database for storing particular data in response to an SQL statement; an execution unit for carrying out database operations for executing the SQL statement; and a module, operating in conjunction with the execution unit, capable of detecting presence of a computer virus in the particular data before being accepted for storage in the database.

DETAILED DESCRIPTION

Glossary

Figure 1A:
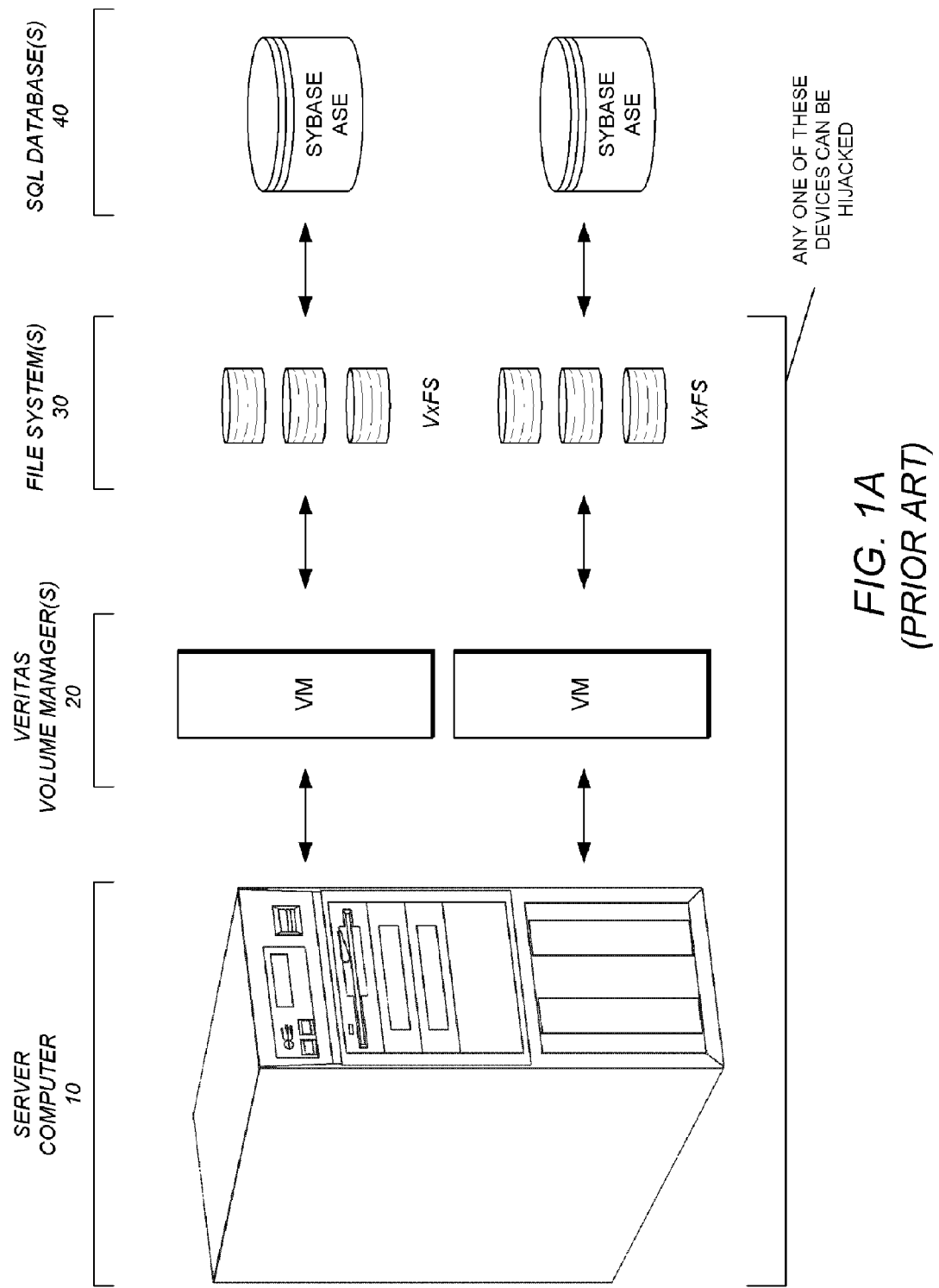
FIG. 1A is a high-level block diagram of a database server system using volume manager technology.

The following definitions are offered for purposes of illustration, not limitation, in order to assist with understanding the discussion that follows.

AES: Advanced Encryption Standard, based on the Rijndael algorithm, is the approved symmetric key algorithm for FIPS-197 replacing DES. AES supports key sizes of 128 bits, 192 bits, and 256 bits and a block size of 16 bytes.

Asymmetric Key: One half of a key pair used in asymmetric ("public key") encryption. It is virtually impossible to deduce the private key if one knows the public key. The public key can be used to encrypt a message that can be decrypted only by the private key.

Blob (or BLOB): Short for binary large object, represents a collection of binary data stored as a single entity in a database management systems. BLOBs are used primarily to hold multimedia objects such as images, videos, and sound, but also can also be used to store programs or even fragments of code.

Block Size: The number of bits from a plaintext stream that are operated on by one "run" of the encryption algorithm. The block size can vary according to the algorithm.

Ciphertext: Encrypted data which is almost impossible to read without the knowledge of a key.

Cryptography: The word cryptography is derived from Greek and when literally translated, means "secret writing." It is the art of concealing information from unauthorized people.

Cryptology: Cryptology is the study of both cryptography and cryptanalysis.

Cryptanalysis: Cryptanalysis is the flip-side of cryptography: it is the science of cracking codes, decoding secrets, violating authentication schemes, and, in general, breaking cryptographic protocols. The various techniques in cryptanalysis attempting to compromise cryptosystems are referred to as attacks.

Database Administrator: The Database Administrator (DBA) is a user with the permissions required to maintain the database. The DBA is responsible for ensuring that all housekeeping routines are performed on the database, which may include designing and maintaining the structure and content of the (many) tables which together form the database, and the relationships between these tables.

DDL: Short for Data Definition Language, a set of statements or language enabling the structure and instances of a database to be defined in a human-readable and machine-readable form. SQL, for example, contains DDL commands that can be used either interactively, or within programming language source code, to define databases and their components (e.g., CREATE and ALTER commands).

Decryption: Decryption is the reverse of encryption; it is the transformation of encrypted data back into an intelligible form. Decryption requires a key.

DES: Data Encryption Standard is the name of the Federal Information Processing Standard (FIPS) 46-3, which describes the Data Encryption Algorithm (DEA). It is a symmetric key algorithm that uses a 56-bit key and a block size of 8 bytes to encrypt data. Because of its small key size DES can be cracked in a reasonable time by modern day computing systems and is therefore inadequate for most present-day security applications.

DML: Short for Data Manipulation Language, a set of statements used to store, retrieve, modify, and erase data from a database.

Encryption: Encryption is the process of converting plaintext (e.g., a text message, a communication, or other data) into a coded format (i.e., from "plaintext" into a form called "ciphertext"), which cannot be read by other parties unless decrypted. It is the process of disguising a message or data in such a way as to hide its substance. Encryption and decryption rely on keys. The purpose of encryption is to ensure privacy by keeping information hidden from anyone for whom it is not intended, even those who have access to the encrypted data.

Encryption Algorithm: An encryption algorithm takes a plain text message and a key and mathematically scrambles the message in such a way that the only way to unscramble the message is by using a decryption program and the correct key. An encryption algorithm is also known as a cipher.

Encryption Key: Encryption and decryption generally require the use of some secret information, referred to as a key. A key is a string of bits with a length that is dependent on the encryption algorithm. There are two types of keys: symmetric and asymmetric.

Initialization Vector: An initialization vector (IV) may be applied to the first block of a plaintext stream before encryption. Without an IV, if the same key is used to encrypt two identical pieces of data then their encrypted values will be identical as well. This allows a cryptanalyst to derive meaning from observing repeated values. Use of an initialization vector insures that the cipher text is unique.

Key Management: The various processes that deal with the creation, distribution, authentication, and storage of keys.

Key Pair: A private key and its related public key.

Plaintext: The data to be encrypted. Plaintext is unencrypted data which is in readable form.

Public Key Cryptography: Public key cryptography uses two keys. A message encrypted with one key can be decrypted with the other. The encryption key is often called the public key, and the decryption key is often called the private key. Usually one key is private and the other is public. Public key cryptography is also called asymmetric key cryptography.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

Sybase ASE: Sybase® Adaptive Server® Enterprise (ASE) is an enterprise-level database system available from Sybase, Inc. of Dublin, Calif. The currently preferred embodiment is constructed by making certain modifications to ASE, as described in detail herein.

Symmetric Key: A single key used to encrypt and decrypt a message. A symmetric key is also known as a secret key.

System Administrator: The System Administrator (SA) handle tasks that are not specific to applications and works outside the database system's discretionary access control system. System Administrator tasks include: Managing disk storage; Monitoring the database system's automatic recovery procedure; Fine-tuning the database system by changing configurable system parameters; Diagnosing and reporting system problems; Backing up and loading databases; Granting and revoking the System Administrator role; Modifying and dropping server login accounts; Granting permissions to database system users; Creating user databases and granting ownership of them; and Setting up groups which can be used for granting and revoking permissions.

System Security Officer: The System Security Officer (SSO) performs security-related tasks. The System Security Officer can access any database (e.g., to enable auditing) but, in general, has no special permissions on database objects. Security-tasks tasks include: Granting and revoking the System Security Officer and Operator roles; Administering the audit system; Changing passwords; Adding new logins; Locking and unlocking login accounts; Creating and granting user-defined roles; Administering network-based security; and Granting permission to use the set proxy or set session authorization commands; and Setting the password expiration interval.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1B is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass)

storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1B, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, such as Microsoft Windows 9x, Microsoft Windows NT, Microsoft Windows 2000, or Microsoft Windows XP (all available from Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 1B:
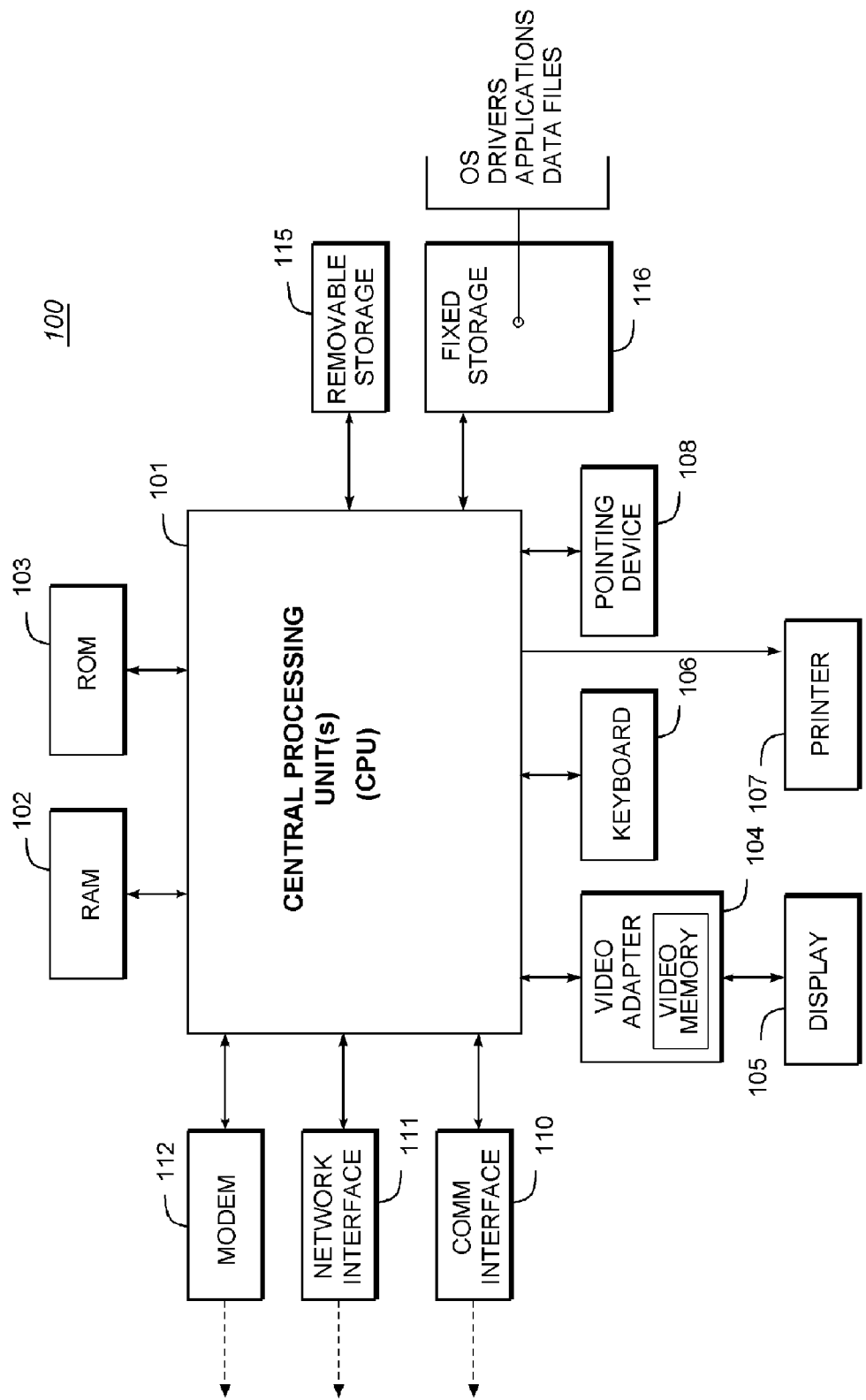
FIG. 1B is a very general block diagram of a computer system (e.g., an IBM-compatible system) in which software-implemented processes of the present invention may be embodied.
Figure 2:
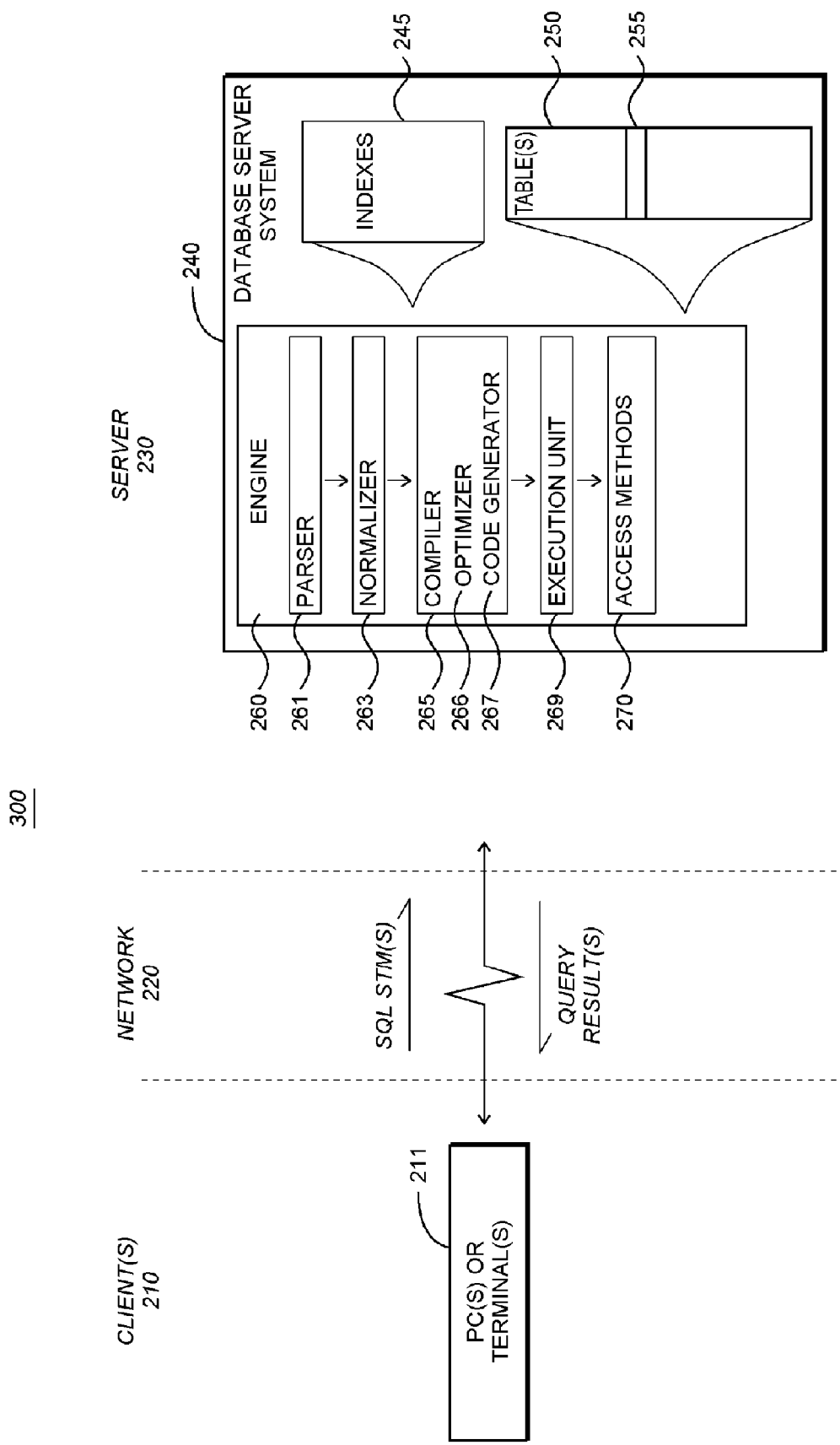
FIG. 2 illustrates the general structure of a client/server database system suitable for implementing the present invention.

While the present invention may operate within a single (standalone) computer (e.g., system 100 of FIG. 1B), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100.

Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying client and server computer components that may be employed for implementing the present invention. For purposes of discussion, the following description will present examples in which it will be assumed that there exists a "server" (e.g., database server) that communicates with one or more "clients" (e.g., database clients operating on personal computers, on mobile devices, or on other servers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Secured Database

A secured database system is described with functionality to store, categorize, and search unstructured data with antivirus (AV) protection in the database. In the currently preferred embodiment, the above described database system is modified to implement methodology for securing and protecting data in both online and archive modes. The database system provides an encrypted file system that is optimized for database storage security. Coupled with encrypted column level storage (at the data model level) and native virus scanning and protection at the encrypted file system level, the database system provides robust security. In this manner, database users can bolster their security infrastructure in the data center.

The present invention provides a solution that ensures data correctness, as well as system flexibility, security, and interoperability. Correctness is provided by ensuring that all data is properly encrypted and decrypted. Back door mechanisms are not allowed to decrypt data without that particular database system started. Flexibility is provided by having both disk encryption and viral protection solutions configurable at fine grained level, including at individual disks and individual database (e.g., text/image/blob) columns. Security is ensured by using robust key management and strong encryption of data at rest, as well as securing data within one's own internal network/firewall (including against unauthorized actions of Systems Administrator). Interoperability is providing by making the features transparent to applications and users that interface with a secured database.

In accordance with the present invention, the problem of the loophole that currently exists between the operating system domain and database domain is solved by adopting a solution that goes down to a common platform, one where both system administrators and database administrators interact. That common platform occurs at the level of the file system or device-level storage. By putting an encrypted file system in place that implements appropriate checks and balances, unscrupulous system administrators may now be prevented from compromising the database system. In particular, the approach of the present invention protects certain aspects of the databases system with encryption such that even if a system administrator has physical access to the database (e.g., access to the storage device containing the database), the system administrator will still be unable to compromise the database since he or she will lack appropriate decryption keys necessary to gain access to the database. More particularly, the approach of the present invention employs a third person or entity, the security officer (SO), who must participate in order for the database system to be unlocked by the necessary decryption keys.

The approach of the present invention may be implemented across a variety of different device drivers, focusing on the issue of who can access information from a storage (not process) level. Since the approach is implemented as a software infrastructure, it is easily adaptable to different operating system environment, including Microsoft Windows, UNIX, Linux, and Macintosh operating systems, as well as a variety of different hardware platforms (including Intel, PowerPC, and Sparc). In contrast to appliance-based approaches, the present invention does not require that the customer buy any particular hardware or operating system for implementing the solution. Instead, customers may utilize their existing environments.

In accordance with the present invention, the security officer (SO) creates a certificate or key that is used for initial provisioning of devices. The key itself is encrypted and may conveniently be stored on a separate disk. The key may now be used to provision devices; here, the SO grants temporary access to the key for the purpose of provisioning devices. Once the devices have been provisioned, the SO removes access to the certificate. This is perhaps best illustrated by considering a practical application of this approach.

Figure 3:
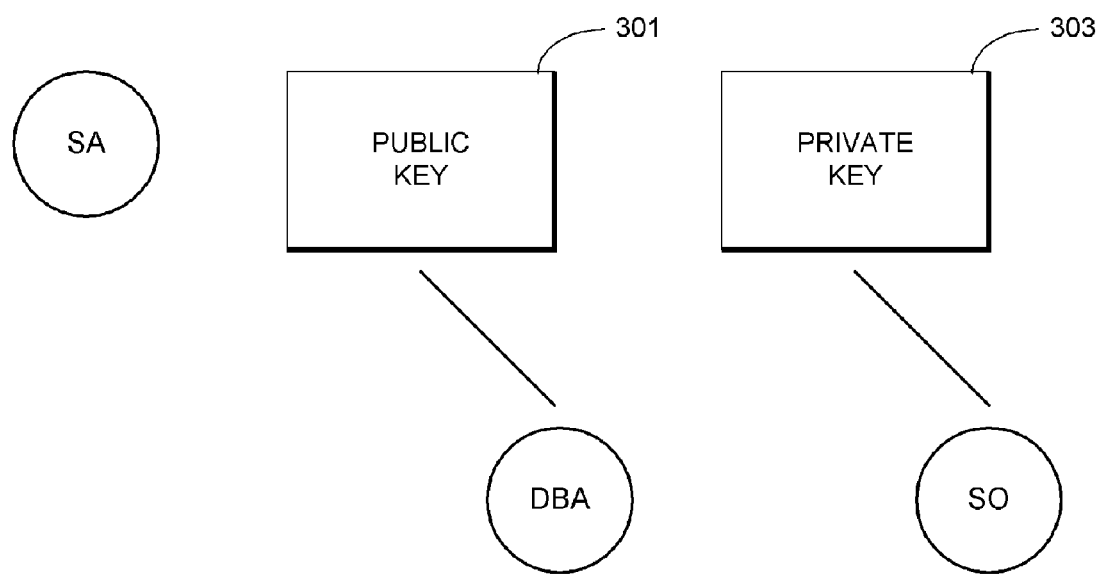
FIG. 3 is a block diagram illustrating participation among a system administrator (SA), a database administrator (DBA), and a security officer (SO).

Consider the scenario illustrated in FIG. 3, which includes participants comprising a system administrator (SA), a database administrator (DBA), and a security officer (SO). An asymmetric key pair is generated. As described below, each key is private to a particular participant (i.e., it is not shared publicly). However, in order to simplify the discussion which follows the asymmetric key pair will be referred to as comprising a public/private key pair—public key 301 and private key 303—as that is the usual nomenclature used to describe the individual keys of an asymmetric key pair. However, the reader should not misconstrue the "public" key 301 as a key that is shared among participants. Instead, it is a decryption key that is kept private to its holder.

With the SA, DBA, and SO participants, the asymmetric key pair may be used in accordance with the present invention to secure a newly-provisioned database as follows. The public key 301 is made available only to the DBA and the database's built-in validation process. In the currently preferred embodiment, the SA and SO do not have access to the public key 301. The DBA's use of the public key 301 preferably requires authentication (e.g., with username/passphrase, or security token). In a similar manner, the private key 303 is made available only to the SO, and thus it is not available to the DBA or the SA. In this embodiment, the SA does not have access to the public/private key pair. As a consequence, the SA does not have any ability himself or herself to encrypt or decrypt information that is used to secure the database. The SA may of course have access to other keys for purposes of other encryption or decryption apart from the security mechanism described herein.

Addressing Security Risks

Infected Objects in the Database

Customers are exposed to viruses with unstructured data (e.g., images, documents, programs, binary data, or the like) within the database and therefore may benefit from native antivirus protection inside the database system. With existing present-day solutions, customers have three choices: (1) Rely on trusted sources and store only objects from trusted sources; (2) Do multiple parses and scans external to the application and then store; and (3) Take a risk and store objects. Both choices (1) and (2) have business or implementation penalties for the customer. Therefore, in accordance with the present invention, a better approach is provided by embedding such capabilities in the database itself. In this manner, the present invention removes the restriction of relying only on trusted sources, and reduces the penalty of parse, scanning, and storing data or objects.

In the currently preferred embodiment, the database system incorporates existing (e.g., third party) virus scan/protection libraries and integrates them within the database. The DBA can specify during the design/creation of schema what columns need to be scanned for virus protection. In this fashion, when the data is inserted (e.g., through SQL commands, stored procedures, client side libraries, or the like), the database system provides automated, on-the-fly scanning and detection of viruses in objects slated for storage in the database.

Storage Security in Data Center Operations

Database systems can separate responsibilities between data creators and owners of data by providing encrypted columns functionality. However, the same cannot be assured at the operational level between SAs (who are aware of the file system/storage subsystem details) and the DBAs (who are aware of the data schemas of the database). This exposes a risk in the data center as the SA and the DBA can act in concert as cohorts to compromise data security. SAs can hijack raw data stores (devices) and work with DBAs to reconstruct the hijacked data stores compromising the entire system. This can be online disks or database archive dumps. Having data stored in the database encrypted file system will prevent hijacking to both online and streaming data, as well as archived data.

Device-Level Encryption

Key Management, Generation, and Storage

Key management, including both generation and secure storage of cryptographic keys, is arguably one of the most important aspects of encryption. If keys are poorly chosen or stored improperly, then it is easier for a cryptanalyst to break the encryption. Rather than using a "brute force" attack (that is, cycling through all the possible keys in hopes of finding the correct decryption key), cryptanalysts often seek weaknesses in the choice of keys, or in the way keys are stored. In the currently preferred embodiment, keys are generated using Security Builder Crypto™, a standards-based toolkit available from Certicom of Mississauga, Ontario Canada. Large key sizes (at least 128 bits) are provided. Users can create keys with lengths 192 and 256 for better security. Once generated, the keys are stored in an encrypted manner by the database system. In the currently preferred embodiment, the keys are encrypted stored on disk using the AES algorithm.

A potential vulnerability of key storage lies with the key that is used to encrypt the above-mentioned key. This key-encrypting key is constructed from a password. The password is set by the SSO as the "system encryption password." System encryption passwords are preferably not too short or easy to guess, so that the security of the encryption keys is not compromised. Keys encrypted by the system encryption password are still vulnerable to attacks by the system administrator or DBA. The system encryption password is stored in the database, in an encrypted form using a key constructed by using static data elements.

The foregoing vulnerability may be address by:

Securing database dumps (physically securing media containing database dumps, or using password protected dumps);

Keeping data encryption keys in a database separate from the database in which encrypted data lies and physically separating and securing the media containing the database dumps;

Ensuring only select and trusted DBAs are granted SSO privileges; and

Using user defined passwords and non-persistent system encryption passwords.

Keys can be further protected by having a limited lifetime. If the user suspects that an attacker may have obtained the key, the key should be considered compromised, and its use discontinued. The system includes a special utility to reinitialize the data on the device (presently done when the server is offline).

Passwords

Default passwords (system encryption passwords) can be changed frequently to enhance key security. The use of default passwords yields lower security, but higher convenience compared to the avoidance of such default passwords.

User defined passwords address the above vulnerability by allowing users to secure their encryption keys (and therefore their data) with a user-supplied password. Password protection of keys can be used to mitigate the ability of a DBA—or other privileged user—to see data in the database. This is of course not a substitute for vetting a DBA properly, or for limiting the use of powerful system privileges. If an untrustworthy user has significant privilege, there are multiple threats he can pose to an organization, which may be far more significant than viewing unencrypted credit card numbers. With regard to auditing, tracing and monitoring, the database system ensures that decrypted data is not casually viewable in this way. To prevent illegal access of the passwords or the raw keys in memory, the memory for the passwords/keys is initialized (i.e., overwritten) after use.

To prevent an illegal access of the network, SSL is preferably used for network connections. SSL may be used, for example, to keep the key encryption password secure. SSL can also be used to prevent data tampering in network packets, memory, and data on disk, thereby mitigating the risk of tampering. Typically, a given operating system used (e.g., UNIX, Windows, or the like) will provide controls to mitigate the risk of tampering memory and data-on-disk. These augment the access control measures provided by the database system to guard against tampering of data using SQL commands.

A ciphertext-only attack is addressed as follows. Recall that this is an attack in which the cryptanalyst obtains a sample of ciphertext, without the plaintext associated with it. A successful ciphertext-only attack is extremely difficult, and requires a very large ciphertext sample, such as from database dumps, replication server queues, and database devices. By encrypting the data using initialization vectors/random padding, data patterns are hidden so that, even if the cryptanalyst gets hold of the ciphertext, he or she will not be able to get information from it. Additionally, access control policies prevent users from accessing the ciphertext through normal SQL channels.

System Components

Introduction

The antivirus database functionality in the database system of the present invention allows users to securely store unstructured data that is protected with antivirus protection, and most importantly provide storage security for the database devices in the data center preventing covert attacks that are coordinated by DBA and SA. The storage security feature is provided as a database option that significantly improves the security of data at rest, by providing encryption at the disk level using keys that are generated by a neutral party whose responsibilities are not overlapping with SA and DBA. In addition the AV database option is enabled with antivirus protection to image data, text data, object data, binary data, and the like, that are stored inside the database.

Figure 4:
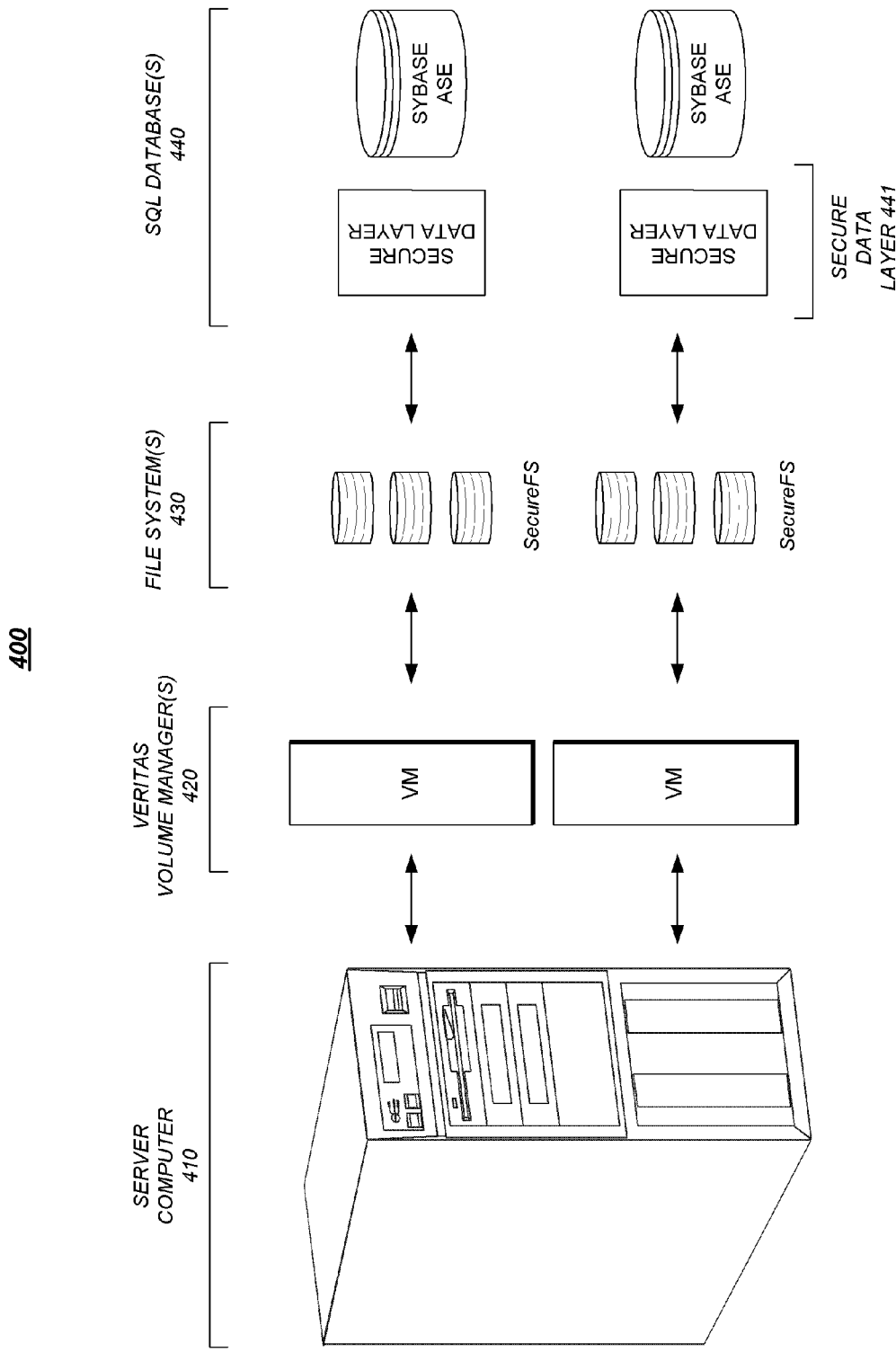
FIG. 4 is a high-level block diagram illustrating modifications to the database server system of FIG. 1A, for implementing the secured database system of the present invention.

FIG. 4 is a high-level block diagram illustrating modifications to the database server system 1 (FIG. 1A). In a manner similar to system 1, system 400 includes a server computer 410, running under the control of an operating system, that may host or incorporate one or more volume managers 420 that effectively sit on top of the operating system's file system 430, for communication with SQL database(s) 440. However, system 400 includes an additional component: secure data layer(s) 441. The secure data layer 441 provides a secured (encrypted) file system mounted on top of the existing operating system file system. Here, the system uses device encryption in the form of a Stackable File System (SFS)/Virtual File System (VFS) that is embedded in the database system. The SSO creates keys that are used for disk initialization. The DBA may then use the keys when disk(s) are defined and initialized (an existing "DISK INIT" command is enhanced to take the key). The database system disk startup (routines) is extended to understand the attributes of the disk that is registered in the database system's system table "sysdevices" and to overlay an encrypted stackable file system of the present invention. An encrypted file system is employed where write/read calls encrypt/decrypt the data based on the key that is passed during mounting of the secured file system. Since the mount is done by the database system, the underlying device cannot be deciphered even if it is hijacked. CREATE TABLE and ALTER TABLE (SQL commands) are extended to take additional attributes when defining text/image columns (or other columns desired to be protected). Additionally, database engine-level support is added for antivirus protection, thereby preventing the uploading or insertion of computer viruses or other malicious programs (e.g., spyware, worms, Trojan horses, or the like) into the database.

In the currently preferred embodiment, the system uses a key creation system used for supporting an encrypted columns feature. For further discussion of the key creation, see commonly-owned, presently-pending application(s): application Ser. No. 10/711,929, filed Oct. 13, 2004, entitled "Database System Providing SQL Extensions for Automated Encryption and Decryption of Column Data". For purposes of the invention herein, any comparable key creation system may be employed.

Stackable File System/Virtual File System (a) File System Overview

Linux, like most operating system, separates its file system code into two components: native file systems (UFS, NFS, EXT2, EXT3, etc.) and a general-purpose layer called the virtual file system (VFS). The VFS is a layer that sits between system call entry points and native file systems. The VFS provides a uniform access mechanism to file systems without needing to know the details of those file systems. When file systems are initialized in the kernel, a set of function pointers (methods in OO-speak) is installed for the VFS to use. The VFS, in turn, calls these pointer functions generically, without knowing which specific file system the pointers represent. For example, an aio_write system call gets translated into a service routine sys_aio_write which invokes the vfs_aio_write( ) VFS function, which invokes a file system-specific method by using its installed function pointer.

Figure 5:
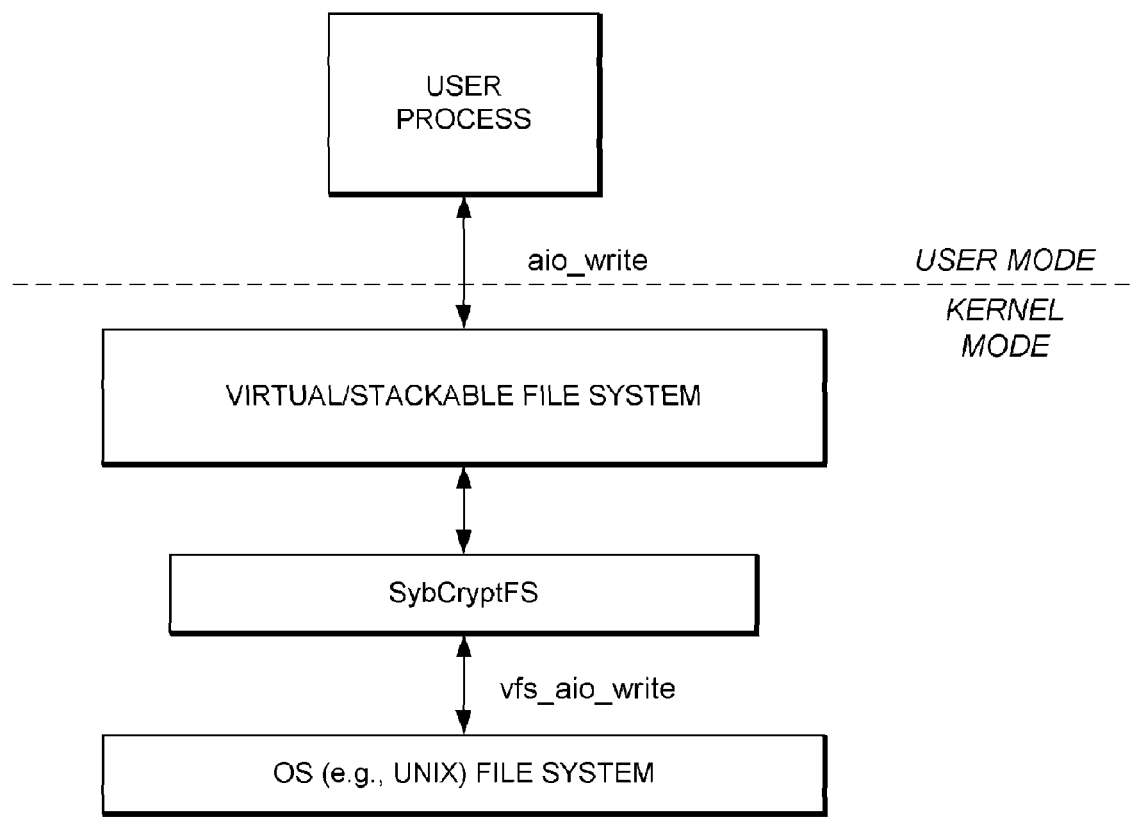
FIG. 5 is a high-level block diagram illustrating a stackable file system that uses a secured (SybCryptFS) file system or data layer of the present invention.

The VFS layer allows file systems to be stacked. FIG. 5 is a block diagram illustrating such a stackable file system that uses SybCryptFS file system. In general, stackable file systems can exist standalone and be mounted on top of any other existing file system mount point. Thus one need only develop a (stackable) file system once, and it will work with any other native (low-level) file system such as ext2, NFS, and the like.

(b) Basic Stackable File System Operation

The basic function of a stackable file system is to pass an operation and its arguments to the lower-level file system. The following distilled code snippet shows how a stackable null-mode pass-through file system (SybCryptFS) handles the→write( ) operation:

---

```
1: int sybcryptfs_write(struct inode *dir, struct dentry *dentry, struct
*page page, unsigned long offset, unsigned int count)
2: {
3:   int err = 0;
4:   struct inode *sybfs_lower_dir;
5:   struct dentry *sybfs_lower_dentry;
6:   /* we need to encrypt the data */
7:   retval = Sybcrpt_fs_encrypt(page, count, *dir, &Encrypted_page,
&Encrypted_count);
8:
9:   sybfs_lower_dir = get_lower_inode(dir);
10:  sybfs_lower_dentry = get_lower_dentry(dentry);
11:
12:  /* now write the encrypted data using the regular write */
```

```
13: lower_dir->write(lower_dir, lower_dentry, &Encrypted_page,
    offset, Encrypted_count);
14:
15: /* post-call code can go here */
16: return err;
17: }
```

Importantly, the data is encrypted at line 7, before that data is written out using a regular write operation at line 13.

(c) Encrypted File System

For clarity of description of the following high-level design, it is assumed that the reader is familiar with Sybase ASE architecture or comparable relational database architecture. (See, e.g., above-mentioned "Adaptive Server Enterprise 15.0 Collection" documentation set.) Further, it is assumed that Sybase ASE is installed and configured with a master device where metadata to boot strap the server is kept. The DBA initializes and registers devices to be used with the Sybase ASE database system. For example, the DBA will do the following after logging in:

```
isql -Usa -P<password>
1> disk init name = "DBDEV1", physname="/work/
       SERVER1/DBDEV1.DAT", size = 10 GB
2> go
```

The SSO can enforce security such that a table, say CUSTOMERS, should be encrypted all the way through. The DBA will then do the following.

```
isql -Usa -P<password>
1> disk init name = "CUSTOMERS",
       physname="/work/SERVER1/CUSTOMERS.DAT",
       size = 10 GB WITH ENCRYPTION_KEY = <KEY_NAME>
2> go
```

In response, ASE initializes the disk and internally does an overlay mount of /work/SERVER1/CUSTOMERS.DAT with SybEncryptFS filesystem. From here on, all writes to this device will be encrypted. If the data is dumped/viewed/probed through the native file system without ASE assistance, the data will be completely encrypted. Only ASE can read the encrypted data and perform decryption. The DBA will place the CUSTOMERS table in this device after adding the device to the userdb, as follows.

```
isql -Usa -P<password>
1> alter database USERDB on CUSTOMERS = 10G
2> go
Extending database by 1024 pages (2.0 megabytes) on disk CUSTOMERS
1> use USERDB
2> go
1> sp_addsegment CUSTOMER_SEGMENT, USERDB, CUSTOMERS
2> go
1> sp_placeobject CUSTOMERS_SEGMENT, CUSTOMERS
2> go
```

The above sequence of steps will enforce complete encryption of customer data. Since the device was created with an encryption attribute, the ASE database system opens the device after mounting the device with SybCryptFS as an overlay option. When ASE is shut down, it will unmount the SybEncryptFS filesystem on /work/SERVER1/CUSTOMERS.DAT.

When the VFS needs to unlink a file in a sybcryptfs file system, it calls a sybcryptfs_write function, passing it the inode of the directory in which the file to write resides (dir) and the name of the entry to write (encapsulated in dentry). Every file system keeps a set of objects that belong to it, including inodes, directory entries and open files. When using stacking, multiple objects represent the same file—only at different layers. For example, the sybcryptfs may keep a directory entry (dentry) object with the clear-text version of the filename, while ext2 will keep another dentry with the ciphertext (encrypted) version of the same name. To be truly transparent to the VFS and other file systems, stackable file systems keep multiple objects at each level.

Lower-Level Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). The following focuses on code changes made in the database system components, in order to implement features of the present invention.

Figure 6:
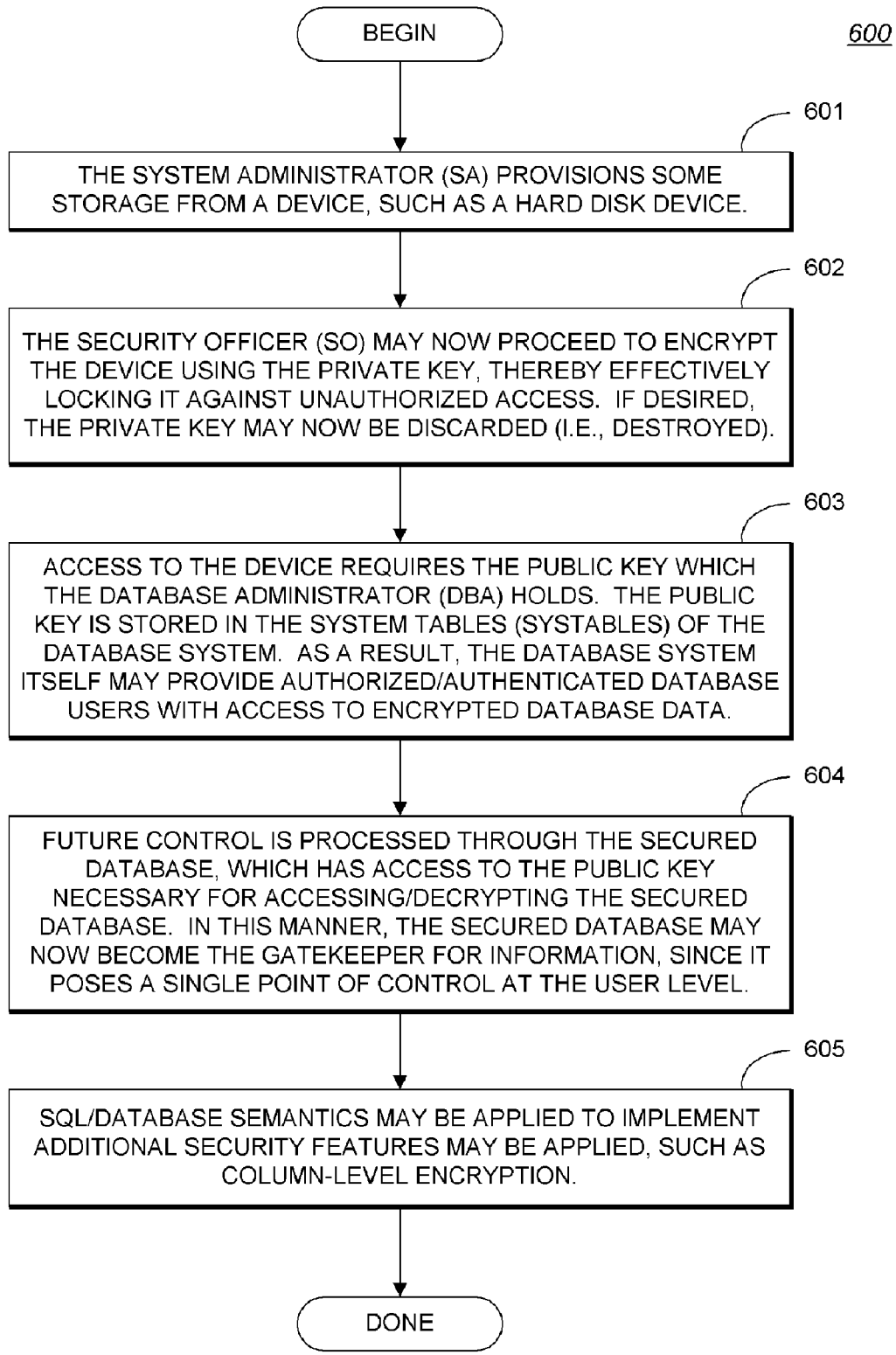
FIG. 6 is a high-level flowchart illustrating the basic process for provisioning a device and provisioning a secure database in accordance with the present invention.

FIG. 6 is a high-level flowchart illustrating the basic process for provisioning a device and provisioning a secure database in accordance with the present invention. At the outset, the system administrator (SA) provisions some storage from a device, such as a hard disk device, as indicated by step 601. At step 602, the security officer (SO) may now proceed to encrypt the device using the private (encryption) key, thereby effectively locking it against unauthorized access. If desired, the private key may now be (optionally) discarded (i.e., destroyed). As indicated by step 603, access to the device requires the public (decryption) key which the database administrator (DBA) holds. The public key is stored in the system tables ("systables") of the database system. As a result, the database system itself may provide (i.e., using its built-in database privileges mechanism) authorized/authenticated database users with access to encrypted database data. Note particularly that the SA is not provided any access to the public key and therefore is not in a position to meaningfully access the secured database (as it is encrypted on the storage device). As illustrated by step 604, future control is processed through the secured database, which has access to the public key necessary for accessing/decrypting the secured database. In this manner, the secured database may now become the gatekeeper for information, since it poses a single point of control at the user level (i.e., which user can access a given piece of data). Finally, as indicated by step 605, SQL/database semantics may be applied to implement additional security features may be applied, such as column-level encryption.

Figure 7:
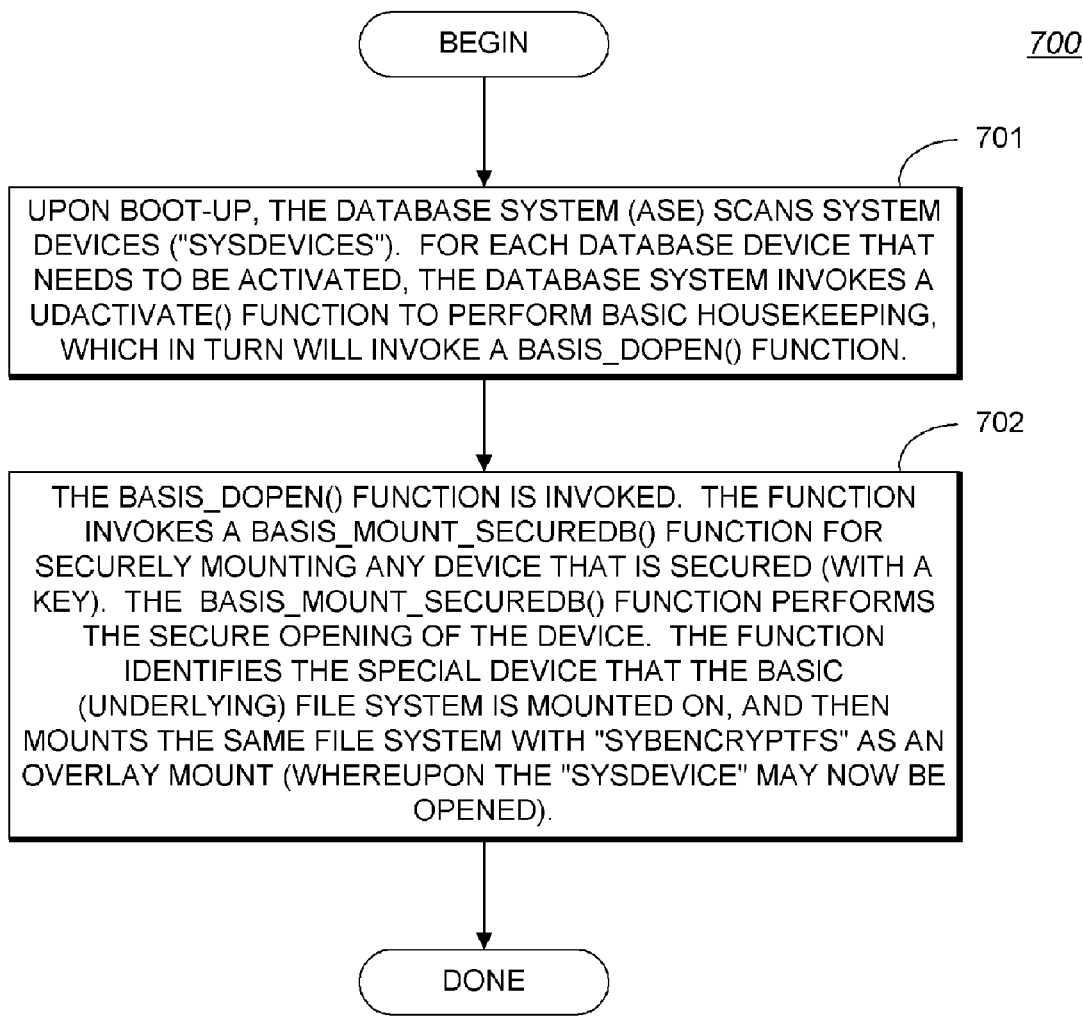
FIG. 7 is a flowchart illustrating a method of the present invention for server startup.

FIG. 7 is a flowchart illustrating a method 700 of the present invention for server startup. Upon boot-up, the database system (i.e., Sybase ASE) scans system devices ("sysdevices"), as shown at step 701. Specifically, a disk_startup( ) routine is invoked to open all database devices. The routine will scan "sysdevices" and call the ASE kernel level routine udactivate( ). A "system device" in this context is a logical construct that represents such objects as a database residing on a physical storage device; such a device may be implemented as a file on a host operating system's file system. For each database device, the udactivate( ) function performs basic housekeeping. Then, if a device needs to be encrypted, the function attempts to mount the device with encryption. Ultimately, this triggers the invocation of a basis_dopen( ) function, which is described next.

At step 702, the basis_dopen( ) function is invoked. Of interest herein, the function invokes a basis_mount_securedb( ) function for securely mounting any device that is secured (with a key). The basis_mount_securedb( ) function performs the secure opening of the device. The function identifies the special device that the basic (underlying) file system is mounted on, and then mounts the same file system with "sybencryptfs" as an overlay mount, whereupon the "sysdevice" may now be opened. In the currently preferred embodiment, the basis_dopen( ) function may be implemented as follows (e.g., using the well-known C programming language).

```
 1: /*
 2: ** BASIS_DOPEN
 3: **
 4: ** basis_dopen(name, dopen_flags)
 5: **
 6: ** Open the named file.
 7: **
 8: ** In many implementations this will be a macro.
 9: **
10: ** Parameters:
11: ** name file name
12: ** flags The value of the dvstat stored in the virtual disk
13: **
14: ** Returns:
15: ** The results of the basis open call (ie. a file descriptor or
16: ** system error indication).
17: **
18: **
19: **
20: */
21:
22: int
23: basis_dopen(char * name, long flags)
24: {
25:    int status; /* Return status from open( ) call. */
26:    int mode; /* Mode to be passed to open( ) call. */
27:
28:    /* Read-only? */
29:    if (flags & DV_READ_ONLY)
30:    {
31:       mode = O_RDONLY;
32:    }
33:    else
34:    {
35:       mode = O_RDWR;
36:
37: #if !MACOSX
38:       /* If requested to open for data sync, set appropriate flag. */
39:       if (flags & DV_DSYNC)
40:       {
41:          mode |= O_DSYNC;
42:       }
43: #endif /* !MACOSX */
44:    }
45:
46:    /* support for securedb */
47:
48:    if (flags & DV_SECURE)
49:    {
50:       status = basis_mount_securedb(name);
51:    }
52:
53:    /* if the mount has failed for some reason return */
54:    if (return < 0)
55:    {
56:       return FALSE;
```

-continued

```
57:    }
58:
59:    /* 3rd parameter is ignore since O_CREAT is never set here. */
60:    SYSCALL_INTR_RETRY(status, SRV_OPEN(name, mode, 0));
61:
62:    return status;
63: }
```

Of particular interest herein is the program logic appearing at lines 48-50. There, the function tests a flag (DV_SECURE), for determining whether the device (under consideration) needs to be securely mounted. In the event that the flag is set, the function invokes a basis_mount_securedb( ) function (at line 50) for securely mounting the device. The result of that invocation is stored in "status," a local integer variable which will hold the return value.

At a high level, the basis_mount_securedb( ) function functions as follows. If the device is secured (specifically, enabled with a secure key), the function will scan the system catalog to get the corresponding key for the device. Additionally, the function identifies the special device that the basic (underlying) file system is mounted on, and then mounts the same file system with "sybencryptfs" as an overlay mount (whereupon the device may now be opened). The function may be implemented as follows.

```
 1: /*
 2: ** BASIS_MOUNT_SECUREDB
 3: **
 4: ** basis_mount_securedb(char *name)
 5: **
 6: ** We have the db device given here. We have to do the following
 7: ** to secure the database. Otherwise we will be reading/writing
garbage
 8: **
 9: ** 1) Find the mount point of the original device
10: ** 2) Mount the root with overlay with our sybcryptfs file system
11: **    in /rootname_sybcryptfs
12: ** 3) Now instead of opening the given path, prefix with
13: **    /rootname_sybcrptfs/givenpath
14: **
15: ** For example if the given path is /sybdevices/customers.dat
16: ** we will be opening /sybdevices_sybcryptfs/sybdevices/
customers.dat
17: **
18: ** Opening the /sybdevices/customers.dat will see garbage. However
19: ** opening the /sybdevices_sybcryptfs/sybdevices/customer.dat will
20: ** see correct data because the sybcryptfs will do the right
21: ** decryption
22: **
23: ** Parameters:
24: ** name name of the sybase device
25: **
26: ** Returns:
27: ** The results of this basis routine.
28: */
29:
30: int
31: basis_mount_securedb(char *name)
32: {
33:    struct stat sbuf; /* file level info */
34:    struct statvfs ubuf; /* filesystem level info */
35:       int retval;
36:    dev_t st_dev;
37:    void *key; /* private key for this file system */
38:    char cryptdbdev[MAXDEVNAME+1];
39:    char specialdev[MAXDEVNAME+1];
40:
41:    /* do the stat to get the mountpoint */
42:       SYSCALL_INTR_RETRY(retval, statvfs(name, &ubuf));
43:
```

-continued

```
44:   if (retval < 0)
45:   {
46:      return FALSE;
47:   }
48:
49:   /*
50:   * if the file system already an sybcryptfs then no
51:   ** need to mount and reopen. Just open the device
52:   ** as is.
53:   ** NOTE: This may happen as multiple db files may be
54:   ** in the same file system
55:   */
56:   if (!STRCMP(&ubuf.f_basetype, "sybcryptfs"))
57:   {
58:      return TRUE;
59:   }
60:
61:   /* get the special device that was mount */
62:   retval = scfs_get_specialdev(name, &specialdev);
63:   if (retval < 0)
64:   {
65:      return FALSE;
66:   }
67:
68:   /* work to do here */
69:   key = (void *)scfs_getkey_for_device(name);
70:
71:   if (key == (void *)NULL)
72:   {
73:      ex_callprint("NO KEYS FOUND FOR THIS DEVICE %*s.
Please see errorlog for more information and corrective action\n", name);
74:
75:      return FALSE;
76:   }
77:
78:   /* create the mount point */
79:   sprintf(cryptdbdev, "/sybcryptfs_%s", name);
80:
81:   /*
82:   ** mount the device as overlay so that we don't need
83:   ** the heavy lifting that a normal file system has to do
84:   */
85:         SYSCALL_INTR_RETRY(retval,
86:         mount(specialdev, cryptdbdev, MS_DATASTR |
MS_OVERLAY,
87:            "sybcryptfs", key, keylen, NULL, NULL));
88:
89:   if(retval < 0)
90:   {
91:      return FALSE;
92:   }
93:
94:   return TRUE;
95: }
```

The specific operation is as follows. The function is invoked with a "name" parameter, which is the name of the device (i.e., sysdevice or file). At line 42, the function invokes a system call to get the mount point of the device (sysdevice). If the call fails for any reason (tested at line 44), the function returns "false" (i.e., unsuccessful mount). At line 56, the function tests what type of file system the mount resides on. If the type is "sybcryptfs," then the device is already mounted on the secure file system. If not, then at line 62 the function calls a low-level workhorse routine, scfs_get_specialdev, to get the special device (i.e., raw device). Here, the special device is mounted onto a file system (i.e., in a manner equivalent to mounting a raw device onto a UNIX file system), for example, mounting it onto /mnt/mount/device1. Once the special device is mounted, the scfs_get_specialdev( ) function sets the special device name (via a parameter, specialdev, which is passed by reference).

At line 69, the function invokes a scfs_getkey_for_device( ) helper routine, in order to get the encryption key for that particular (name) device. The helper routine may be implemented as follows:

```
1: /*
2: ** SCFS_GETKEY_FOR_DEVICE
3: **
4: ** scfa_getkey_for_device (char *name)
5: **
6: ** We have the db device given here.
7: **
8: ** Scan systemcatalog SYSENCRKEYS to get the varbinary data
9: ** of the private keys defined for this particular sybase db
10: **
11: ** Parameters:
12: ** name name of the sybase device
13: **
14: ** Returns:
15: ** The cipher key stored in ASE catalog for this device
16: **
17: ** Currently the keys are stored in system catalogs.
18: **  But it can be stored outside in encipher or lock device.
19: */
20: scfs_key *
21: scfs_getkey_for_device(name)
22: {
23:    SYB_BOOLEAN foundkeys = FALSE;
24:    SDES *sysencrkeys;
25:    SCAN_RESOURCE_DCL(sysencr_srs);
26:    SCAN_BUFFER_DCL(keys, SYSENCRKEYS,
SYBENCRFS_KEYBUFSIZE);
27:    SCAN_BUFFER_DCL(keylen, long,
SYBENCRYPT_KEYSIZE);
28:
29:    SET_SRS_MASTEROBJ(sysencr_srs, NULL, SYSENCRKEYS);
30:    SET_SRS_ROWCOPY(sysencr_srs, keys, keylen);
31:    SET_ACCTL(&sysencr_srs, SSA_DEFER_FETCH);
32:    SET_L1READ(&sysencr_srs);
33:    sysencr.srs_status |= SRS_ABORT_ON_ERROR;
34:
35:    sdes_scan_setup(&sysencr_srs, SCAN_NOINDEX,
SCAN_NORMAL, NULL, 0);
36:    sysencrkeys = SCAN_SDES(&sysencr_srs);
37:
38:    /* set the argument for the scan */
39:    setarg(sysencrkeys, &Sysencrkeys[DATNAME], EQ, name);
40:
41:    foundkeys = FALSE;
42:    while (getnext(sysencrkeys))
43:    {
44:       /* copy the keys */
45:       keys = COLLOCATE(sysencrkeys, &keylen, KEYBUF);
46:       return (keys);
47:    }
48:
49:    /* could not find any keys defined for this sybase db device */
50:    if (foundkeys == FALSE)
51:    {
52:       return (scfs_key *)NULL;
53:    }
54: }
```

As shown, the scfa_getkey_for_device( ) function scans the system catalog looking for the corresponding encryption key(s) for the particular device. Any found keys are copied at line 45. The keys themselves are stored in a binary format, which may support (e.g., encapsulate) X.509 certificates or the like.

Execution returns back to basis_mount_securedb( ) at line 71, whereupon the function determines whether a valid key was obtained (i.e., not NULL). If a valid key is not found, the function returns an error condition (lines 73-75). At this point (i.e., in the case that the function did not return with a NULL value), the function has obtained a valid key and knows the special device name. Now, the function may proceed to mount the special device as an overlay; this is done via an OS call at line 85-87 of basis_mount_securedb( ).

The complementary function to basis_dopen( ) is basis_dclose( ), which occurs in the context of a system (server) shut down. The function may be implemented as follows.

```
1: /*
2: ** BASIS_DCLOSE
3: **
4: ** basis_dclose(fd)
5: **
6: ** Close the given file.
7: **
8: ** In many implementations this will be a macro.
9: **
10: ** Parameters:
11: ** fd file descriptor
12: **
13: ** Returns:
14: ** The results of the basis close call
15: */
16:
17: int
18: basis_dclose(int fd)
19: {
20:
21:     SYB_BOOLEAN status = FALSE;
22:
23:     /* UNMOUNT the filesystem before closing the files */
24:     status = basis_unmount_securedb(fd);
25:
26:     if (status < 0)
27:     {
28:         ex_callprint("SYSTEM UNMOUNT and CLOSE FAILED. Please check the sybase errorlog for detailed information\n");
29:         return status;
30:     }
31:
32:     return (close(fd));
33: }
```

The operation is straightforward. The function simply calls a lower-level workhorse routine, basis_unmount_securedb( ), to unmount the secured file system.

Figure 8:
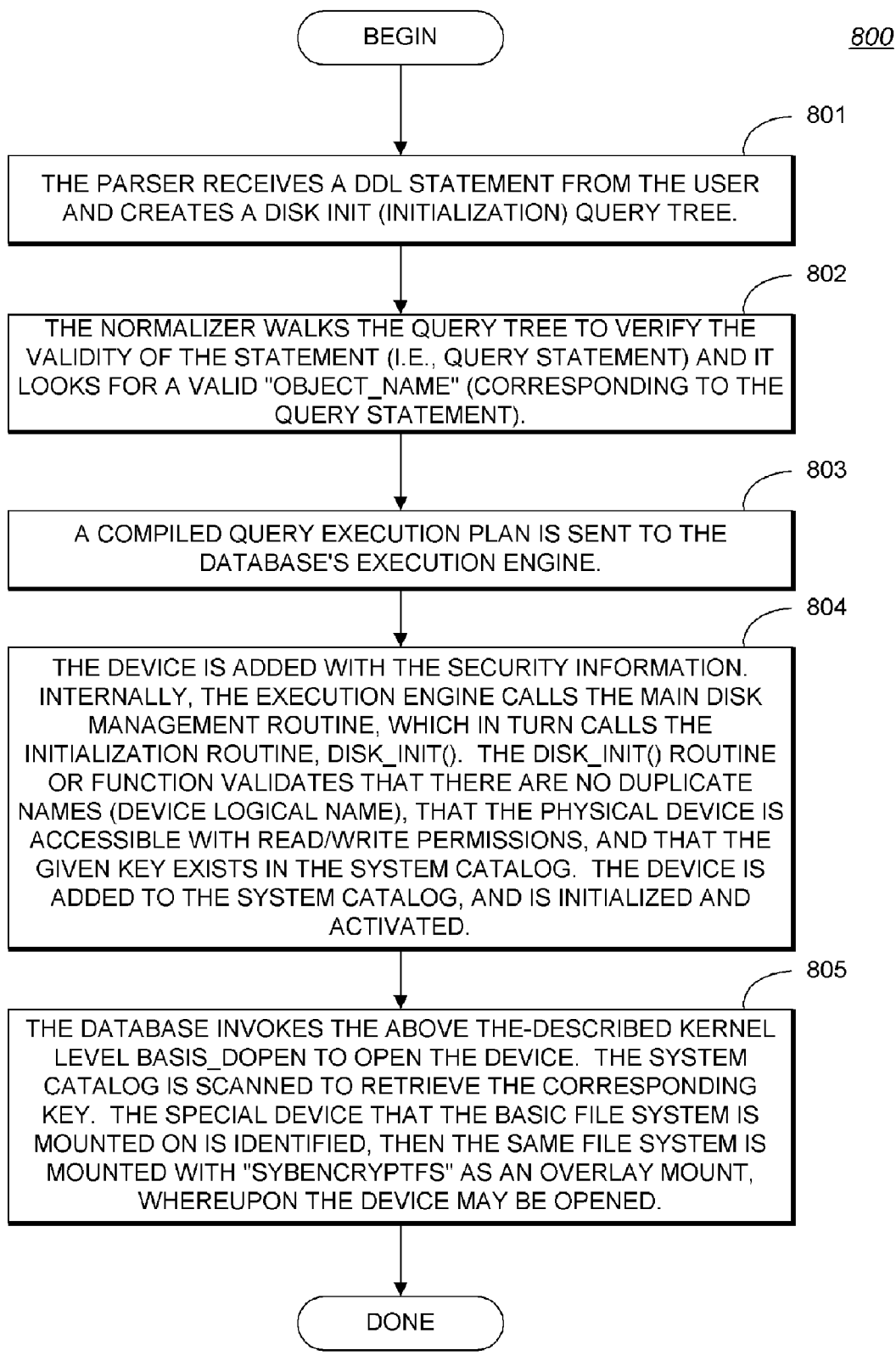
FIG. 8 is a flowchart illustrating a method of the present invention for disk initialization (e.g., under control of an administrator issuing SQL statements).

FIG. 8 is a flowchart illustrating a method 800 of the present invention for disk initialization (e.g., under control of an administrator issuing SQL statements). The first three steps comprise conventional (existing) steps. At step 801, the parser receives a DDL statement from the user and creates a "disk init" (initialization) query tree. At step 802, the normalizer walks the query tree to verify the validity of the statement (i.e., query statement) and looks for a valid "object_name" (corresponding to the query statement). Next, at step 803, a compiled query execution plan is sent to the database's execution engine.

At step 804, the device is added with the security information. Internally, the execution engine calls the database system's main disk management routine, which in turn calls the initialization routine, disk_init( ). The disk_init( ) routine or function validates that there are no duplicate names (device logical name), that the physical device is accessible with read/write permissions, and that the given key exists in the system catalog. For description of key creation and management, see commonly-owned application Ser. No. 10/711,929, filed Oct. 13, 2004, entitled "Database System Providing SQL Extensions for Automated Encryption and Decryption of Column Data," particularly FIGS. 4A-B and 5, and accompanying description. (For purposes of the method described herein, it is only necessary to receive access (e.g., via a logical key name) to some valid key.) The device (upon meeting those conditions) is added to the system catalog, and is initialized and activated. Finally, at step 805, the database (Sybase ASE) invokes the above-described basis_dopen( ) to open the device. If the device is enabled with a secure (encryption) key, the system catalog will be scanned to retrieve the corresponding key. The special device that the basic file system is mounted on is identified, then the same file system is mounted with "sybencryptfs" as an overlay mount, whereupon the device may be opened.

Engine-Level Antivirus Support

Database systems allow the storing unstructured data (i.e., non-SQL data types) through image and text columns. However, this poses a vulnerability as database clients can construct images or other binary data with embedded viruses or other malware, and store them in databases. Other database clients may then unwittingly consume these by retrieving them and processing them, thus potentially getting infected. For example, today it is possible for a malicious user (including disgruntled DBA) to encode a virus into a JPEG file (image data type) and load that file into a database. When the "image" (virus) file data is retrieved, for example for display by a Web browser or the like, the virus payload is delivered and thus potentially infects that end user. For databases systems supporting large user populations (e.g., server supporting large e-commerce sites), thousands of users may become infected in a very short period of time. In accordance with the present invention, therefore, the foregoing secured database system is enhanced with a methodology to provide antivirus protection to databases. In particular, it is desirable to provide antivirus protection against binary data (e.g., image data, document data, blob data, or the like) that may be used to upload a computer virus or other malicious or unauthorized program to a database.

Figure 9A:
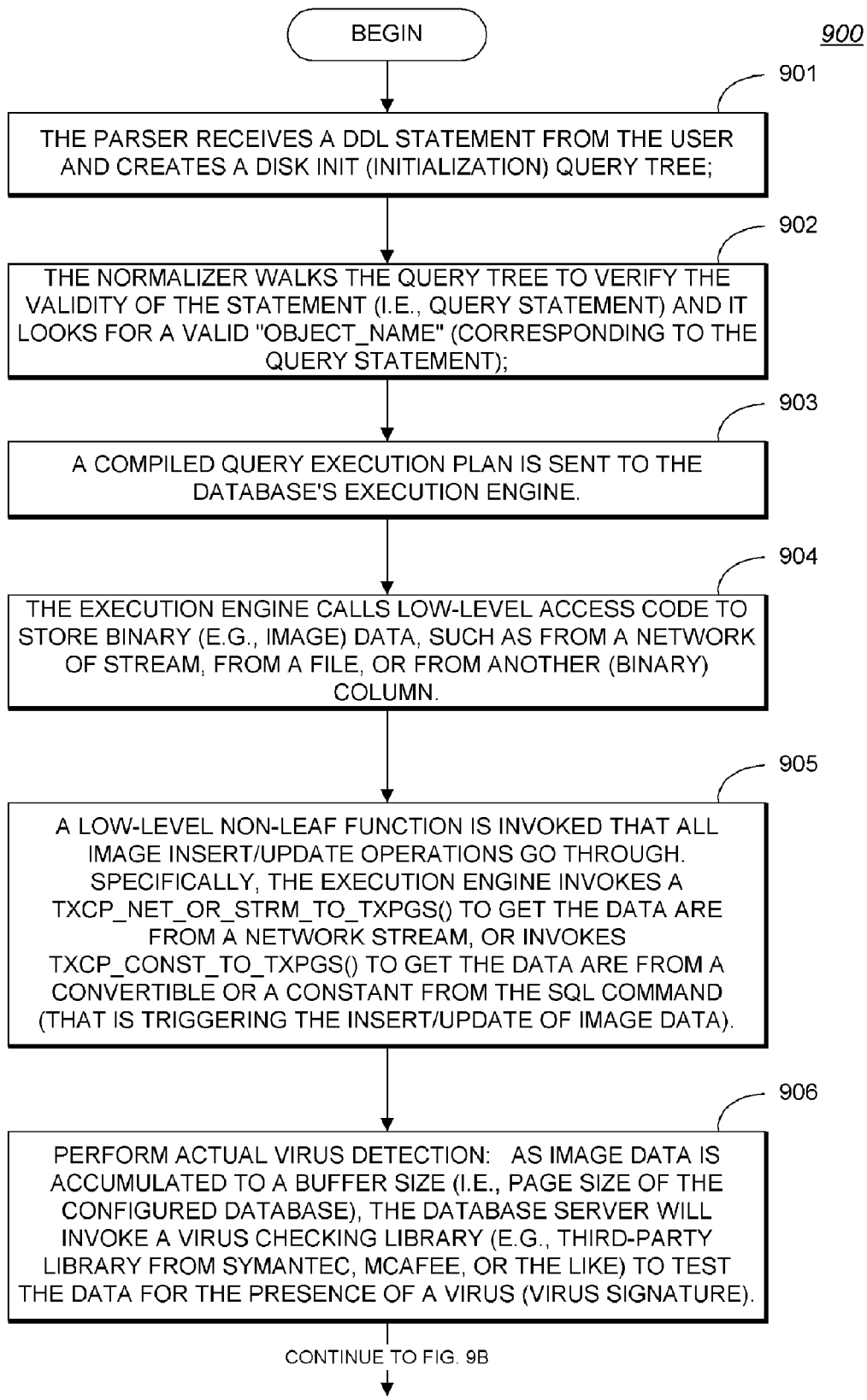
FIGS. 9A-B comprise a flowchart of a method of the present invention for providing database engine-level antivirus protection.
Figure 9B:
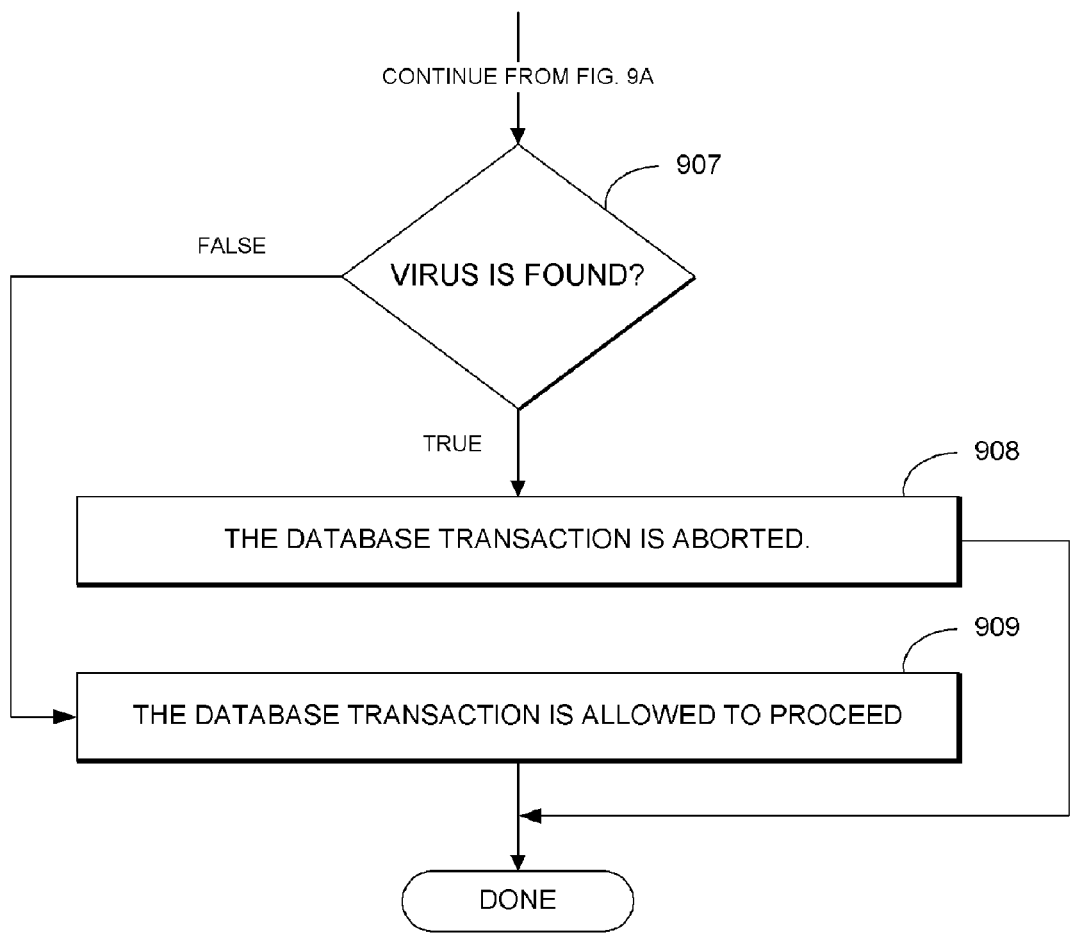

In accordance with the present invention, any data (especially binary data) that is being stored to and/or retrieved from the database (e.g., during a database transaction) may be tested for computer viruses/malware or other undesirable binary sequence. FIGS. 9A-B comprise a flowchart of a method 900 of the present invention for providing database engine-level antivirus protection. The first three steps comprise conventional (existing) processing steps, such as described for the method of FIG. 8. At step 901, the parser receives a DDL statement from the user and creates a "disk init" (initialization) query tree; at step 902, the normalizer walks the query tree to verify the validity of the statement (i.e., query statement) and it looks for a valid "object_name" (corresponding to the query statement); and at step 903, a compiled query execution plan is sent to the database's execution engine. The fourth step (show as step 904) is also a conventional step, which illustrates that the execution engine calls low-level access code to store binary (e.g., image) data, such as from a network or stream, from a file, or from another column (especially of binary data).

Step 905 indicates invocation of a low-level non-leaf function that all insert/update operations go through, for example, for image data. Specifically, the execution engine invokes a txcp_net_or_strm_to_txpgs( ) to get the data from a network or stream, or invokes txcp_const_to_txpgs( ) to get the data from a variable or a constant from the SQL command. At step 906, the method performs actual virus detection. Here, as image data is accumulated to a buffer size (i.e., page size of the configured database), the database server will invoke a virus-checking library (e.g., third-party library from Symantec of Cupertino, Calif., McAfee of Santa Clara, Calif., or the like) to test the data for the presence of a virus (virus signature). If a virus is found ("true") at step 907, the corresponding database transaction is aborted (step 908)—uploading of the virus-laden data into the database is denied. Otherwise, the database transaction is allowed to proceed, as indicated at step 909.

For example, the following implementation of the txcp_net_or_strm_to_txpgs( ) function demonstrates database engine-level support for antivirus protection:

```
1: /*
2: ** TXCP_NET_OR_STRM_TO_TXPGS
3: **
4: ** Low level TEXT/IMAGE data mover to copy data from the network
5: ** (i.e., the client) or from a stream interface onto TEXT/IMAGE
6: ** data pages, optionally logging the data in
7: ** XCHANGE log records (of type XREC_TEXTINSERT) along the way.
8: **
9: ** If input column is replicated but no updated, no data movement occurs,
10: ** only log records describing the columns current value is logged.
11: **
12: ** Arguments:
13: ** d_sdes - Ptr to SDES for destination table.
14: ** d_bpp - Ptr to Ptr to the BUF holding the 1st page of the
15: **        destination TEXT/IMAGE value. This page already has the
16: **        total # data bytes for the destination TEXT/IMAGE value
17: **        placed on it.
18: **        (*** Note: In one special case, the # data bytes on
19: **        the 1st page will be silently changed before returning.
20: **        That case is where we have a partial character at the
21: **        end of the transmission from the client, and codeset
22: **        conversions are OFF. If codeset conversions are on,
23: **        we will see a FOUCVT error, since the partial character
24: **        cannot be converted into the server's character set.)
25: ** type    - TEXT or IMAGE.
26: ** logging  - TRUE if logging is required, FALSE if not logging.
27: ** req     - Ptr to a TEXTREQ. The important info contained here is
28: **        in txstat, from which the replication status is determined.
29: **
30: ** Return:
31: ** void
32: **
33: */
34: void
35: txcp_net_or_strm_to_txpgs(SDES * d_sdes, BUF ** d_bpp, int type, int logging,
36:     TEXTREQ *req)
37: {
38:     .....
39:     /*
40:     ** Create the text/image page chain.
41:     ** Continue as long as there are bytes on the net,
42:     ** or we have leftover partial characters.
43:     */
44:     while (rem_net_bytes > 0 || next_pcbeg > 0)
45:     {
46:         /*
47:         ** Store another page's worth:
48:         ** -------------------------
49:         ** Even though the page will be changed here (we read the data
50:         ** directly onto the page), no bufpredirty is done. This should
51:         ** be OK because no one else can have access to this page and
52:         ** we are protected from writes of partial changes by the
53:         ** timestamp which is put on the page below.
54:         */
55:
56:         if (type == IMAGE)
57:         {
58:             /* Datatype is IMAGE, so just read data as binary. */
59:
60:             if (req->txstat & TXNETDATA)
61:             {
62:                 if ((unsigned int)RECVHOST(pss, pgptr, loop_bytes) < loop_bytes)
63:                 {
64:                     ex_raise(TEXTMGR, TXT_UNEXP_ENDOFMSG, EX_USER, 4);
65:                 }
66:             }
67:
68:             rem_net_bytes -= loop_bytes;
69:             rem_page_bytes -= loop_bytes;
70:             totbytes       += loop_bytes;
71:             pgptr          += loop_bytes;
72:         }
73:
74: #if VIRUS_CHECK_ENABLED
75:         /* the virus checker is simple routine */
76:         retval = check_av_for_this_chunk(pgptr, new_freeoff,
77:             virusdescription *vdesc);
78:
79:         if (retval == FOUND_VIRUS)
80:         {
81:             ex_raise(TEXTMGR, TXT_VIRUS_FOUND, EX_CMDFATAL, 1,
82:                 vdesc->signature_name);
83:             /* no return here */
84: #endif /* VIRUS_CHECK_ENABLED */
85:         }
86:     }
87:
88:     /* Write the stnode. */
89:     if (create_stnode)
90:     {
91:         txst_write_stnode(req->txcrt_ctx, d_sdes);
92:         TXT_FLUSH_FTP(d_sdes, logging, d_fbp);
93:     }
94:
95:     return;
96: }
```

As shown particularly at lines 74-84, a pointer to the page (pgptr) where the data is accumulated is passed to a helper function, check_av_for_this_chunk( ), which may check the accumulated data (block) for the presence of a virus (by comparing it against known virus signatures, from a third-party antivirus library). Each successive data block that arrives is checked. In this manner, the database system can provide engine-level antivirus protection against data that arrives via a network or a stream.

In a similar manner, the database system can provide engine-level antivirus protection against data that arrives through other means, such as carefully crafted (e.g., hand coded) data provided via SQL statementd (e.g., as a sequence of hexadecimal input values). For example, the following implementation of the txcp_const_to_txpgs( ) function demonstrates database engine-level support providing antivirus protection in instances of carefully crafted viruses:

```
1: /*
2: ** TXCP_CONST_TO_TXPGS
3: **
4: ** Low level TEXT/IMAGE data mover to copy data from
TEXT/IMAGE CONSTANT
5: ** chain onto TEXT/IMAGE data pages, optionally logging the data in
6: ** XCHANGE log records (of type XREC_TEXTINSERT)
along the way.
7: **
8: ** If input column is replicated but no updated, no data movement occurs,
9: ** only log records describing the columns current value is logged.
10: **
11: ** Arguments:
12: ** d_sdes  - Ptr to SDES for destination table.
13: ** d_bpp   - Ptr to Ptr to the BUF holding the 1st page of the
14: **         destination TEXT/IMAGE value. This page already
15: **         has the total # data bytes for the destination
16: **         TEXT/IMAGE value placed on it.
17: ** cnp     - Ptr to 1st CONSTANT node in chain.
18: ** logging - TRUE if logging is required, FALSE if not logging.
```

-continued

```
19: ** req   - Ptr to a TEXTREQ. The important info contained here is
20: **         in txstat, from which the replication status is determined.
21: **
22: ** Return:
23: ** void
24: **
25: */
26: void
27: txcp_const_to_txpgs(SDES * d_sdes, BUF ** d_bpp, CONSTANT * cnp, int logging,
28:     TEXTREQ * req)
29: {
30:
31:    .....
32:
33:    while (rembytes)
34:    {
35:      loop_bytes = MIN(bytes_left_in_node, bytes_left_on_page);
36:
37:      /*
38:      ** Sanity check ... if for some strange reason we had a
39:      ** CONSTANT node in the middle of the chain with zero bytes
40:      ** of data on it, we will just skip it.
41:      */
42:      if (loop_bytes > 0)
43:      {
44:        /*
45:        ** Move the data onto the page.
46:        */
47:        MEMMOVE(node_ptr, page_ptr, loop_bytes);
48:
49:        .....
50:
51:        /*
52:        ** See if we are done with the current page.
53:        ** If so, let's do all of the processing for it here.
54:        */
55:        if (bytes_left_on_page == 0)
56:        {
57:          /* Calculate TIPSA fields if necessary. */
58:          if (is_multibyte && !rep_only)
59:          {
60:            start = &d_bp->bpage->tp.pdata[this_pcbeg];
61:            end = page_ptr;
62:            WHOLE_CHARS(start, end, wid_map, ign,
63:              this_pcend, next_pcbeg, nchars);
64:            if (this_pcend > 0)
65:              nchars++;
66:            req->txtipsa->tx_pcbeg = this_pcbeg;
67:            req->txtipsa->tx_pcend = this_pcend;
68:            req->txtipsa->tx_charstarts = nchars;
69:            totchars += nchars;
70:          }
71:
72: #if VIRUS_CHECK_ENABLED
73:          /* the virus checker is simple routine */
74:          retval = check_av_for_this_chunk(pgptr,
75:            new_freeoff, vdesc);
76:
77:          if (retval == FOUND_VIRUS)
78:          {
79:            ex_raise(TEXTMGR, TXT_VIRUS_FOUND,
80:              EX_CMDFATAL, 2,
81:              vdesc->signature_name);
82:            /* no return here */
83:          }
84: #endif /* VIRUS_CHECK_ENABLED */
85:        }
86:      }
87:    }
88: }
```

As shown particularly at lines 72-84, antivirus protection has been added in a manner similar to that described for the txcp_net_or_strm_to_txpgs( ) function above. Thus, in this manner, the database system can also provide engine-level antivirus protection against viruses that arrive through means other than a network or a stream. Although the foregoing has been illustrated for providing antivirus protection of image data, those skilled in the art, enabled by the teachings herein, will appreciate that the foregoing methodology may provide database engine-level protection against the storage of any undesirable binary sequence (signature) that one may attempt to place in a database.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for securing a database system, the method comprising:
   under control of a system administrator provisioning storage from a storage device, for storing database information;
   generating an asymmetric key pair comprising an encryption key and a decryption key, said encryption key being made available only to a security officer, and said decryption key being made available only to a database administrator and the database system;
   under control of the security officer utilizing said encryption key so that said database information is stored on the storage device in an encrypted manner;
   under control of the database administrator utilizing said decryption key for decrypting the database information stored on the storage device, wherein access to said decryption key is controlled by the database system based on user privileges;
   receiving a request from a user for access to the database information;
   determining whether the user has been granted privileges allowing to access to the database information;
   if the user has been granted privileges allowing access to the database information, automatically decrypting the database information to provide the access; and otherwise denying the request if the user has not been granted privileges allowing access to the database information;
   wherein no single user has access to both the encryption and decryption keys, and wherein no single user has access to the decryption key and the storage provisioned for storing the database information.

2. The method of claim 1, wherein said encryption key is available only to a user who will not be allowed to have access to the decryption key.

3. The method of claim 2, wherein the user is a security officer.

4. The method of claim 1, wherein said decryption key is available only to a user who will not be allowed to have access to the encryption key.

5. The method of claim 4, wherein the user is a database administrator.

6. The method of claim 1, wherein the step of provisioning storage is required to be performed by a user who does not have access to the encryption key or the decryption key.

7. The method of claim 6, wherein the user is a system administrator.

8. The method of claim 1, further comprising:
   providing a secured file system overlaid on top of an existing operating system's file system, such that the database information is mounted from the storage device in a secure manner so that all writing of the database information is encrypted.

9. The method of claim 8, wherein the secured file system controls read and write operations that affect storage of the database information on the operating system's file system.

10. The method of claim 1, wherein the step of decrypting the database information occurs in a manner that is transparent to the user requesting access, such that the user is unaware that the database information is encrypted.

11. The method of claim 1, further comprising:
providing built-in antivirus protection for the database system, by scanning data submitted for storage by the database system so as to provide native virus scanning and protection at an encrypted file system level.

12. A method for securing a database system, the method comprising:
in response to input from a system administrator, provisioning storage from a storage device for storing database information;
in response to input from a security officer, generating an encryption key from an asymmetric key pair so that said database information is stored on the storage device in an encrypted manner, wherein access to said encryption key is controlled by the security officer;
in response to input from a database administrator, generating a decryption key from said asymmetric key pair for decrypting the database information stored on the storage device, wherein access to said decryption key is controlled by the database system based on user authorization; and
providing access to the database information by decrypting the database information only for authorized users;
wherein no single user has access to both the encryption and decryption keys, and wherein no single user has access to the decryption key and the storage provisioned for storing the database information.

13. The method of claim 12, wherein said encryption key is available only to the security officer.

14. The method of claim 12, wherein said decryption key is available only to the database administrator.

15. The method of claim 12, wherein the storage device is available for provisioning only by the system administrator.

16. The method of claim 12, wherein said decryption key is stored in a system catalog table of the database system.

17. The method of claim 12, further comprising:
providing a secured file system for loading database information from the storage device, said secured file system operating under control of the database system.

18. The method of claim 17, wherein the secured file system intercepts read and write operations, to provide necessary encryption/decryption for controlling storage of the database information on the storage device.

19. The method of claim 12, wherein access to the database information is provided in a manner such that decryption is transparent to users having authorization that allows access to the database information, such that the users are unaware that the database information is encrypted.

20. The method of claim 12, wherein user authorization is based on user privileges that may be granted and revoked to individual database users.

21. A secured database system comprising:
a relational database management system (RDBMS);
a storage device under control of a system administrator for provisioning storage of database information;
an encryption key created from an asymmetric key pair and available only to a security officer for encrypting said database information that is stored on the storage device;
a decryption key, created from said asymmetric key pair and automatically maintained by the database system, for decrypting the database information stored on the storage device, wherein access to said decryption key is not available to the system administrator or the security officer and is controlled by the database system based on user authorization; and
a module for providing access to the database information by automatically decrypting the database information only for authorized users;
wherein no single user has access to both the encryption and decryption keys, and wherein no single user has access to the decryption key and the storage provisioned for storing the database information.

22. The system of claim 21, wherein said encryption key is available only to a security officer.

23. The system of claim 21, wherein said decryption key is available only to a database administrator.

24. The system of claim 21, wherein the storage device is available for provisioning only by a system administrator.

25. The system of claim 21, wherein said decryption key is stored in a system catalog table of the RDBMS.

* * * * *